(12) United States Patent
Hollstein et al.

(10) Patent No.: US 10,353,101 B2
(45) Date of Patent: *Jul. 16, 2019

(54) SYSTEM AND METHOD TO ESTIMATE A PROPERTY IN A BOREHOLE

(71) Applicants: Sven Hollstein, Lower Saxony (DE); Eduard Kirchmeier, Lower Saxony (DE); Hans-Juergen Faber, Niedersachsen (DE); Christian Fulda, Lower Saxony (DE)

(72) Inventors: Sven Hollstein, Lower Saxony (DE); Eduard Kirchmeier, Lower Saxony (DE); Hans-Juergen Faber, Niedersachsen (DE); Christian Fulda, Lower Saxony (DE)

(73) Assignee: BAKER HIGHES, A GE COMPANY, LLC, Houston, TX (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/386,418

(22) Filed: Dec. 21, 2016

(65) Prior Publication Data

US 2017/0101866 A1 Apr. 13, 2017

Related U.S. Application Data

(63) Continuation of application No. 13/398,128, filed on Feb. 16, 2012, now Pat. No. 9,562,428.

(51) Int. Cl.
*G01V 1/40* (2006.01)
*G01V 11/00* (2006.01)
(Continued)

(52) U.S. Cl.
CPC .............. *G01V 1/40* (2013.01); *E21B 49/00* (2013.01); *G01V 3/30* (2013.01); *G01V 11/00* (2013.01); *E21B 47/082* (2013.01)

(58) Field of Classification Search
CPC . G01V 1/145; G01V 1/52; G01V 3/28; G01V 3/30; G01V 1/40; G01V 11/00; E21B 47/082; E21B 49/00
See application file for complete search history.

(56) References Cited

U.S. PATENT DOCUMENTS 5,058,077 A 10/1991 Twist
5,091,644 A 2/1992 Minette
(Continued)

FOREIGN PATENT DOCUMENTS

WO 03014767 A2 2/2003

OTHER PUBLICATIONS

Beger, P.E., "Improving Wellbore Position Accuracy of Horizontal Wells by Using a Continuous Inclination Measurement From a Near Bit Inclination MWD Sensor", 1998 SPE International Conference on Horizontal Well Technology, Nov. 1-4, 1998, pp. 1-9.
(Continued)

*Primary Examiner* — Ian J Lobo
(74) *Attorney, Agent, or Firm* — Cantor Colburn LLP

(57) ABSTRACT

An apparatus for estimating a first property in a borehole penetrating the earth is described. The apparatus includes a carrier configured to be conveyed through the borehole. The apparatus also includes a first sensor disposed at the carrier and configured to perform a first measurement of the first property, the first sensor having a first direction of sensitivity; a second sensor disposed at the carrier and configured to perform a second measurement of a second property, the second sensor having a second direction of sensitivity; and a processor configured to receive the first and second measurements and to correct the first measurement using the second measurement in order to estimate the first property.

12 Claims, 6 Drawing Sheets

(51) Int. Cl.
    *E21B 47/08*     (2012.01)
    *G01V 3/30*     (2006.01)
    *E21B 49/00*     (2006.01)

(56) References Cited

U.S. PATENT DOCUMENTS

| | | | |
|---|---|---|---|
| 5,175,429 A * | 12/1992 | Hall, Jr. | E21B 47/082 |
| | | | 250/254 |
| 5,451,779 A | 9/1995 | Spross et al. | |
| 5,469,736 A | 11/1995 | Moake | |
| 5,486,695 A | 1/1996 | Schultz et al. | |
| 5,726,951 A | 3/1998 | Birchak et al. | |
| 6,618,322 B1 | 9/2003 | Georgi | |
| 7,966,875 B2 | 6/2011 | Proett et al. | |
| 9,562,428 B2 * | 2/2017 | Hollstein | G01V 11/00 |
| 9,766,363 B2 * | 9/2017 | Morys | G01V 3/30 |
| 2004/0168827 A1 | 9/2004 | Jeffryes | |
| 2006/0214664 A1 | 9/2006 | Folberth et al. | |
| 2008/0307875 A1 | 12/2008 | Hassan et al. | |
| 2009/0091327 A1 | 4/2009 | Blanz | |
| 2010/0123461 A1 | 5/2010 | Folberth et al. | |
| 2011/0172923 A1 | 7/2011 | Van Os et al. | |
| 2013/0215715 A1 | 8/2013 | Hollstein et al. | |

OTHER PUBLICATIONS

Clayton et al., "Quartz Thickness-Shear Mode Pressure Sensor Design for Enhanced Sensitivity", IEEE Transactions on Ultrasonics, Ferroelectrics, and Frequency Control, vol. 45, No. 5, Sep. 1998, pp. 1-8.

International Search Report and Written Opinion for PCT Application No. PCT/US2013/024812, dated May 14, 2013, pp. 1-9.

Noy et al., "A New Rate Gyroscopic Wellbore Survey System Achieves the Accuracy and Operational Flexibility Needed for Today's Complex Drilling Challenges", 1997 SPE/IADC Drilling Conference, Mar. 4-6, 1997, pp. 1-11.

* cited by examiner

SYSTEM AND METHOD TO ESTIMATE A PROPERTY IN A BOREHOLE

CROSS-REFERENCE TO RELATED APPLICATIONS

This application is a continuation of U.S. application Ser. No. 13/398,128 filed Feb. 16, 2012, the disclosure of which is incorporated herein by reference in its entirety.

BACKGROUND OF THE INVENTION

Geologic formations are used for many purposes such as hydrocarbon production, geothermal production, and carbon dioxide sequestration. Boreholes are typically drilled to gain access to the formations in order to perform downhole measurements related to the formations. Downhole tools such as while-drilling and wireline tools can be disposed in the boreholes to perform these measurements. However, the accuracy of these tools can be adversely affected by conditions in the borehole such as temperature, mud characteristic, or standoff to the borehole wall. Hence, it would be appreciated in the drilling industry if the accuracy of these tools could be improved.

BRIEF SUMMARY

According to one aspect of the invention, an apparatus for estimating a first property in a borehole penetrating the earth includes a carrier configured to be conveyed through the borehole; a first sensor disposed at the carrier and configured to perform a first measurement of the first property, the first sensor having a first direction of sensitivity; a second sensor disposed at the carrier and configured to perform a second measurement of a second property, the second sensor having a second direction of sensitivity; and a processor configured to receive the first and second measurements and to correct the first measurement using the second measurement in order to estimate the first property.

According to another aspect of the invention, a method for estimating a first property in a borehole penetrating the earth includes conveying a carrier through the borehole; performing a first measurement of the first property using a first sensor disposed at the carrier, the first sensor having a first direction of sensitivity; performing a second measurement of a second property using a second sensor disposed at the carrier at the same time the first measurement is performed, the second sensor having a second direction of sensitivity; and estimating the first property using a processor that receives the first measurement and the second measurement and corrects the first measurement using the second measurement.

According to yet another aspect of the invention, a non-transitory computer readable medium comprises computer readable instructions for estimating a first property in a borehole penetrating the earth by implementing a method. The method includes receiving a first measurement of the first property using a processor, the first measurement being performed by a first sensor disposed in the borehole and having a first direction of sensitivity; receiving a second measurement of a second property at the same time the first measurement is performed using the processor, the second measurement being performed by a second sensor disposed in the borehole and having a second direction of sensitivity; and estimating the first property by correcting the first measurement using the second measurement.

BRIEF DESCRIPTION OF THE DRAWINGS

Referring now to the drawings wherein like elements are numbered alike in the several Figures.

DETAILED DESCRIPTION

A detailed description of one or more embodiments of the disclosed apparatus and method is presented herein by way of exemplification and not limitation with reference to the Figures.

Figure 1:
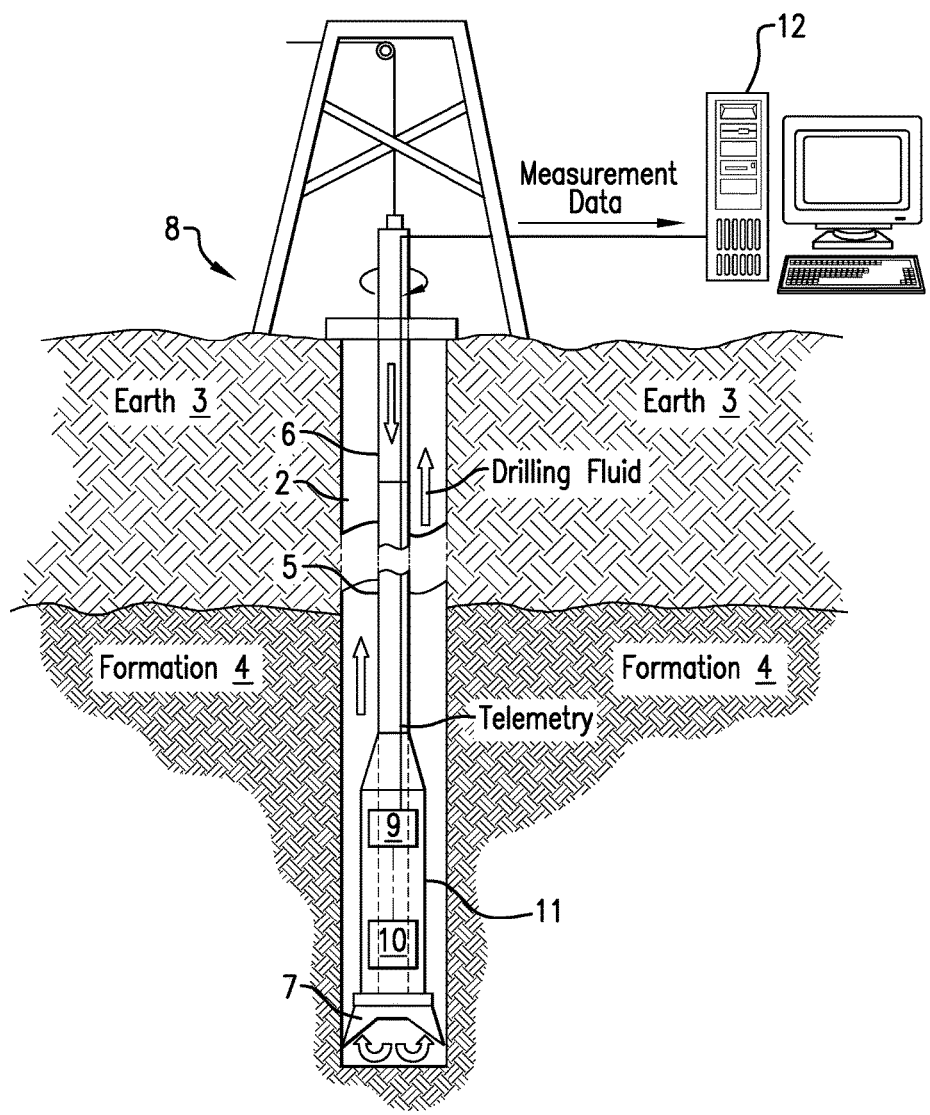
FIG. 1 illustrates a cross-sectional view of an exemplary embodiment of a downhole tool having a hybrid sensor disposed in a borehole penetrating the earth.

FIG. 1 illustrates a cross-sectional view of an exemplary embodiment of a hybrid sensor 10 disposed in a borehole 2 penetrating the earth 3, which includes an earth formation 4. The formation 4 represents any subsurface material of interest. A downhole tool 11 is conveyed through the borehole 2 by a carrier 5. In the embodiment of FIG. 1, the carrier 5 is a drill string 6 in an embodiment known as logging-while-drilling (LWD), but the teachings are not limited to LWD and can be used in other embodiments where the carrier 5 is a wireline (i.e., wireline logging) or a coiled tubing, a completion string, or any other type of conveying system. Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. The downhole tool 11 includes downhole electronics 9 and a hybrid sensor 10 to measure a downhole property such as a formation property or a borehole property. The downhole electronics 9 are configured to operate the downhole tool 11 and/or process measurements or data received from the hybrid sensor 10. Telemetry is used to provide communications between the downhole tool 11 and a computer processing system 12 disposed at the surface of the earth 3. Data gathered by the hybrid sensor 10 may be processed by the computer processing system 12 in addition to or in lieu of the downhole electronics 9.

Figure 2A:
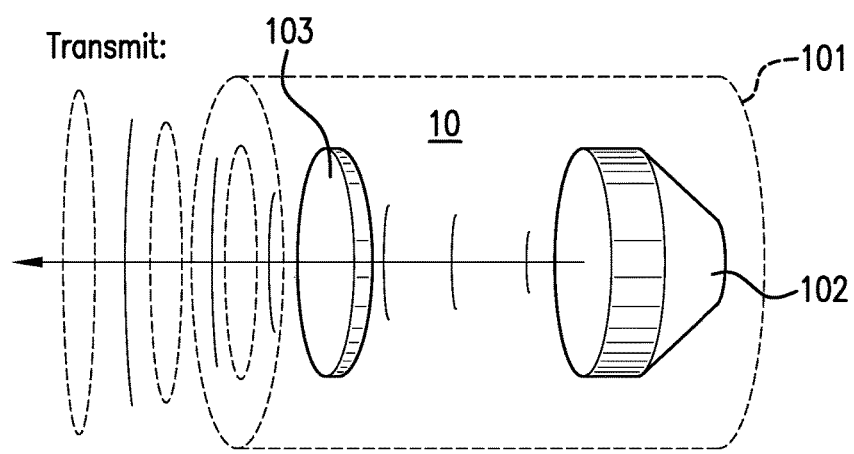
FIGS. 2a and 2b, collectively referred to as FIG. 2, depict aspects of an exemplary embodiment of the hybrid sensor.
Figure 2B:
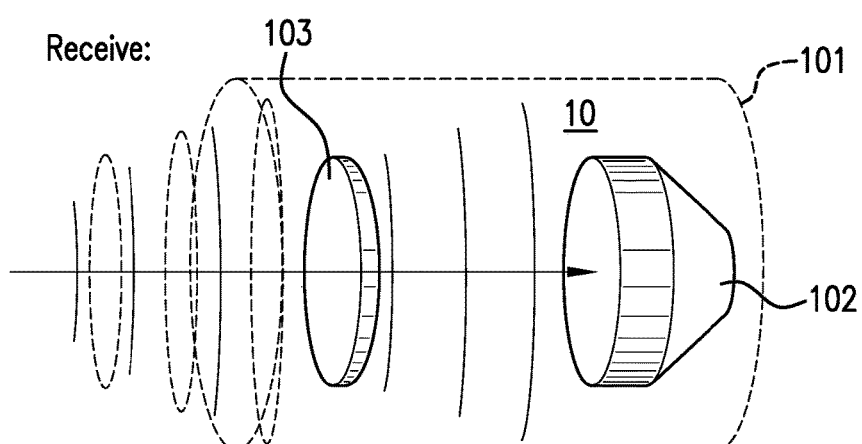

FIG. 2 depicts aspects of an exemplary embodiment of the hybrid sensor 10 of the downhole tool 11. The hybrid sensor 10 includes a first sensor 102 and a second sensor 103 arranged in a housing 101. The first sensor 102 is configured to measure a downhole property of interest while the second sensor 103 is configured to measure another property that is used to increase the accuracy of or apply corrections to the measurement or determination of the property of interest. As an example, FIG. 2 shows a hybrid sensor 10 where the first sensor 102 measures the electromagnetic properties of the formation 4 while the second sensor 103 measures the distance to the borehole 2 wall. In the example of FIG. 2, the first sensor 102 measurement is assumed to be affected by the distance to the borehole 2 wall which is measured by the second sensor 103. FIG. 2a illustrates the hybrid sensor 10 transmitting a signal while FIG. 2b illustrates the hybrid sensor 10 receiving a signal. A transmitter and receiver may be housed in different components of the hybrid sensor 10 or transmission and reception of the signal may be done with the same hybrid sensor 10 component which acts either as a transmitter or as a receiver depending on the measurement mode (commonly known as a transceiver). As shown in FIG. 2, the first and second sensor may be transmitter—receiver systems. Alternatively, the one or both of the sensors 102, 103 may radiate continuously in electromagnetic contact with the formation 4. In this case, the hybrid sensor 10 measures the electric properties of the formation 4.

Figure 3:
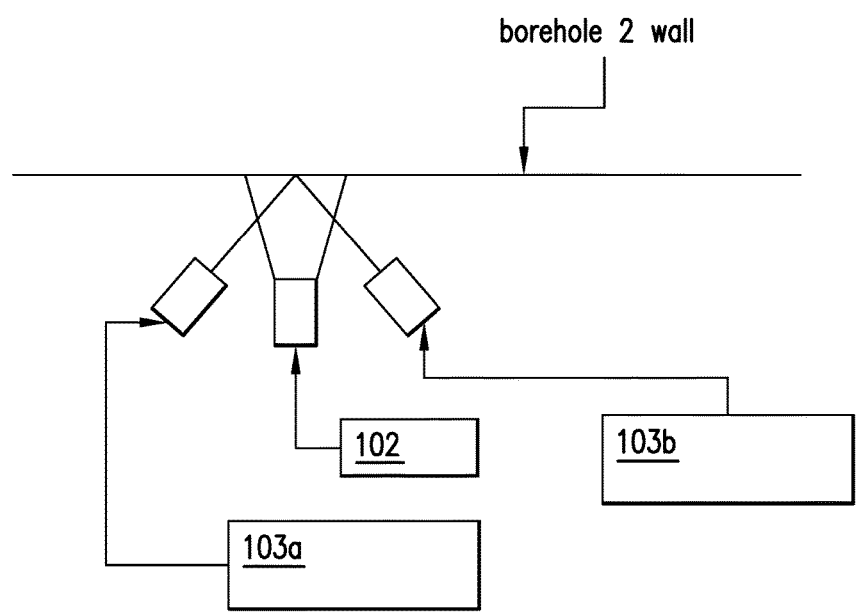
FIG. 3 illustrates an exemplary hybrid sensor according to an embodiment of the invention.

In a different embodiment, one of the sensors 102, 103 may include a transmitter and receiver on each side of the other sensor 103, 102. FIG. 3 illustrates an exemplary hybrid sensor 10 according to an embodiment of the invention. As shown at FIG. 3, the first sensor 102 is a transceiver while the second sensor 103 has a transmitter 103a and receiver 103b as different components. A housing 101 is configured to maintain alignment or geometric positions of the sensors 102 and 103 relative to each other. In another embodiment, the sensors 102 and 103 may be allowed to move relative to each other in the housing 101. In a different embodiment, each of the sensors 102, 103 may be housed separately, and the sensors 102, 103 maintain a fixed or movable geometric position relative to one another. As shown by FIG. 2, the arrangement of the first sensor 102 and the second sensor 103 according to the present embodiment is such that both sensors 102, 103 have the same directional sensitivity (e.g. perpendicular to the tool axis). That is, the direction of sensitivity of measurements of the first sensor 102 and the direction of sensitivity of measurements of the second sensor 103 is the same, as shown at FIG. 2. Additionally, the distance between the two sensors 102, 103 is fixed. However, as discussed below, other embodiments contemplate directions of sensitivity of the first and second sensors 102, 103 that are not the same and may overlap or not overlap at all. As a result, in one embodiment, the second sensor 103 can determine borehole 2 properties (e.g., temperature, mud conditions, distance to the borehole 2 wall (i.e., standoff)) that affect measurements taken by the first sensor 102, and the measurements taken by the first sensor 102 can be corrected based on the properties determined by the second sensor 103. For example, for temperature or mud corrections, the measurement may not be direction sensitive and the distance between the sensors 102, 103 may not need to be fixed. The sensors 102, 103 may each be permeable, partly permeable, partly permeable due to an aperture filled with permeable material, or not permeable.

In another embodiment, the measurements of both the first sensor 102 and the second sensor 103 may be used to determine a property rather than the second sensor 103 output being used only as a correction factor to correct output of the first sensor 102 or, in alternate embodiments, the first sensor 102 output being used only as a correction factor to correct output of the second sensor 103. Accordingly, the term "correcting" as used herein relates to either correcting a measurement performed by the first sensor 102 using measurements of the second sensor 103 or, in alternate embodiments, correcting a measurement performed by the second sensor 103 using measurements of the first sensor 102 or providing measurements of the first and second sensors 102, 103 as input to an algorithm that computes the property of interest. Also, in another embodiment, the first sensor 102 and the second sensor 103 may not have the same directional orientation but may, instead, each have a direction of sensitivity with an overlap in the directions of sensitivity of each of the sensors 102, 103. That is, the direction of sensitivity of one sensor includes at least a component of the direction of sensitivity of the other sensor.

For the embodiment shown at FIG. 2, the signals transmitted and received by the first sensor 102 pass through the second sensor 103. Even when the direction of sensitivity of the sensors 102, 103 is not the same but, instead, overlaps, the signals transmitted by the first sensor 102 intersect the second sensor 103 to some degree. Based on the configuration shown at FIG. 2, in one embodiment, the second sensor 103 is permeable to the signals transmitted by the first sensor 102. The term "permeable" relates to the second sensor 103 being transparent or transmissive to all relevant portions of a signal transmitted or received by the first sensor 102 where the relevant signal portions include information for performing a measurement of the property of interest. The term "permeable" might also be related to the first sensor 102 being transparent or transmissive to all relevant portions of a signal transmitted or received by the second sensor 103 for a different arrangement where the first sensor 102 is in front of the second sensor 103. The term "in front of" conveys that a signal received by the hybrid sensor 10 is first received by the one of the two sensors 102, 103 that is in front of the other. In another embodiment, the first sensor 102 is semi-permeable to the signals transmitted by the second sensor 103. The term "semi-permeable" relates to the first sensor 102 being partially transparent or transmissive to the relevant portions of the signal transmitted or received by the second sensor 103 for a different arrangement where the first sensor 102 is in front of the second sensor 103. Signals passing through a semi-permeable first sensor 102 still include some information relative to performing a measurement of the property of interest. The term "semi-permeable" also relates to the second sensor 103 being partially transparent or transmissive to the relevant portions of the signal transmitted or received by the first sensor 102. Alternatively, in an embodiment in which the second sensor 103 is sensitive to the first sensor 102, the output of the second sensor 103 can be corrected for the effect of the first sensor 102 signal on the second sensor 103. In yet another embodiment, discussed with reference to FIG. 4 below, the first sensor 102 forms an aperture through which the signals transmitted or received by the second sensor 103 pass through. Further, the second sensor 103 may form an aperture through which the signals transmitted or received by the first sensor 102 pass through (i.e., the first sensor 102 is not sensitive to the second sensor 103).

Figure 4A:
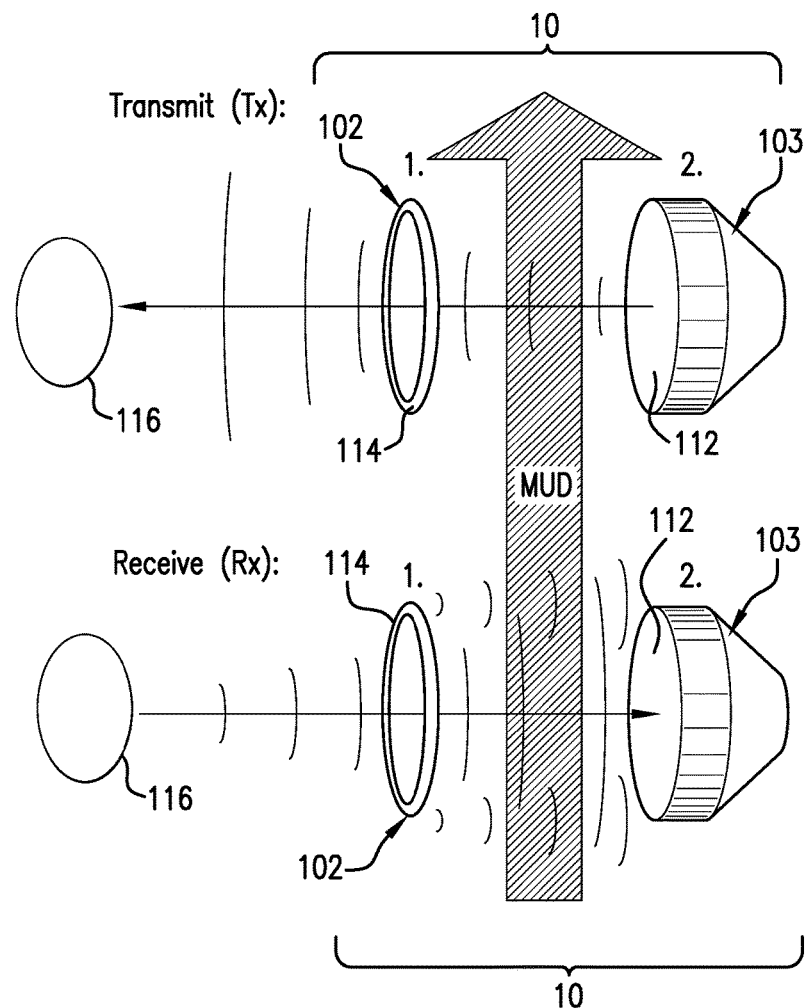
FIGS. 4a and 4b, collectively referred to as FIG. 4, depict aspects of an embodiment of the hybrid sensor.
Figure 4B:
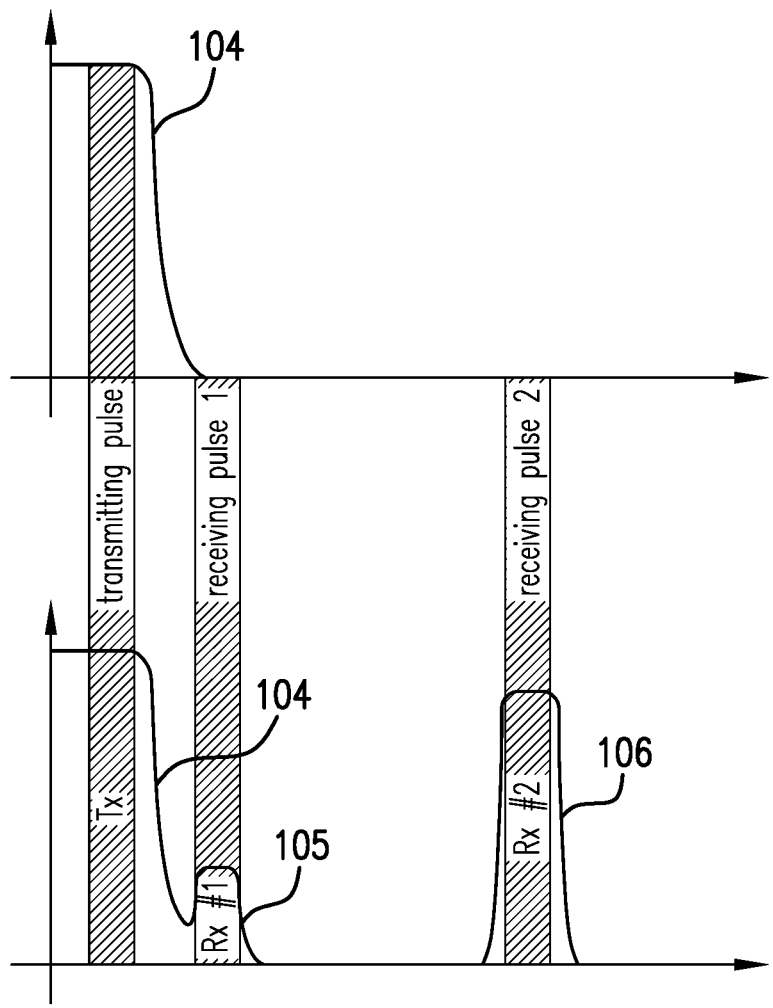

FIGS. 4a and 4b depict aspects of an exemplary embodiment of the hybrid sensor 10 transmitting an exemplary transmitted signal 104 and receiving signals 105, 106 according to an embodiment of the invention. As in the embodiment shown by FIG. 2, the first sensor 102 and the second sensor 103 in the embodiment shown by FIG. 4a also share the same direction of sensitivity. However, other arrangements of the sensors 102, 103 are also contemplated. As shown at FIG. 4a, the second sensor 103 includes an acoustic transducer 112 and the first sensor 102 includes an antenna 114, arranged in front of the acoustic transducer 112. Other sensor types might be used as well. For instance, instead of using an antenna 114, a button electrode is also contemplated. The antenna 114 transmits and receives an electromagnetic signal that is influenced in a defined way by the electromagnetic property of the formation 4. The property may be, for example, resistivity or conductivity of the formation 4. Other properties that can be determined by the hybrid sensor 10 include density, gamma radiation, dielectric permittivity, porosity, and susceptibility. The second sensor 103 includes an acoustic transducer 112 in the present embodiment. Further, the first sensor 102 forms an aperture through which the signals transmitted and received by the second sensor 103 pass through. The standoff of the first sensor 102 is important to know in order to accurately determine the formation 4 electrical properties measured by the antenna 114. Hence, it is important to accurately measure the standoff at the same time and direction at which the antenna 114 performs measurements. Accordingly, the acoustic transducer 112 of the second sensor 103 transmits an acoustic wave, and the travel time of the acoustic signal through the first sensor 102 to a wall of the borehole 2 and back to the second sensor 103 determines the distance (i.e., standoff) of the second sensor 103 to the borehole 2 wall.

A quantitative calculation of the standoff using travel time of the acoustic signal requires knowledge of the signal velocity in mud in order to provide a more accurate standoff measurement. The signal velocity in mud is a function of environmental parameters in the borehole 2 such as temperature, pressure, and mud density. In one embodiment, without the need to know these environmental parameters, qualitative (relative change) measurement of the borehole 2 wall distance can be obtained. In another embodiment, by measurement of mud pressure and temperature and by taking into account the known components of the mud, empirical relationships can be used which are known from the literature to calculate the signal velocity of the mud. Using the embodiments shown at FIGS. 4a and 4b, a quantitative measurement can be made by means of a reflector 116 in the arrangement at a known and fixed distance. The signal reflected at this reflector 116 can be used to determine the time between transmission and reception of the reflected signal. With this additional measurement, the time between the transmitted signal 104 and the received signals 105 is used in conjunction with the known distance between the reflector and the second sensor 103 to determine velocity of the signal through the mud in the borehole 2 as:

2×distance between the reflector 116 and sensor 103/
(time to receive 105)−(time to transmit 104)   [EQ 1]

The reflector 116 can be an additional component within the arrangement or it can be the first sensor 102 which is semi-permeable to the acoustic sensor 112 or which direction of sensitivity only partly overlaps with the second sensor 103 direction of sensitivity, thereby partly reflecting the signal. In these cases, a distinct part of the acoustic wave will be reflected by the first sensor 102 and by taking the known and fixed distance between first and second sensors 102 and 103 into account, the velocity of the acoustic wave can be determined by EQ 1. With this ability to make a quantitative measurement, the hybrid sensor 10 can self-compensate/self-correct its distance measurements without the need for post-processing. Further, the hybrid sensor 10 can provide the mud index value to other tools as needed.

Figure 5:
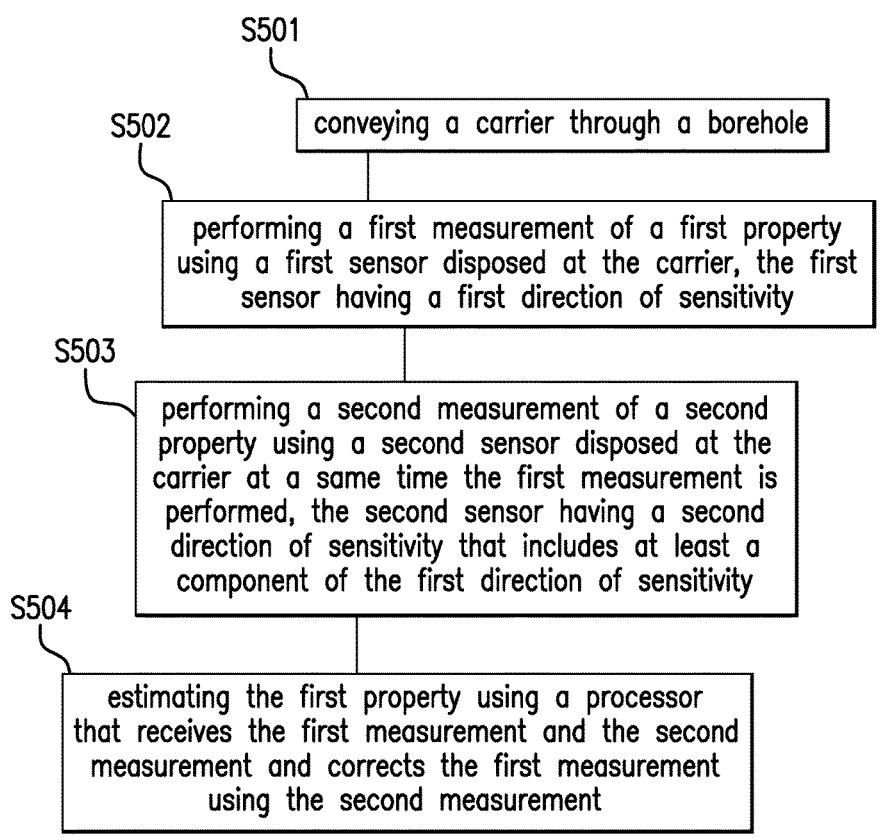
FIG. 5 illustrates the processes involved in estimating a downhole property with the hybrid sensor according to embodiments of the invention.

FIG. 5 illustrates the processes involved in estimating a borehole 2 property with a hybrid sensor 10 according to embodiments of the invention. At block S501, the process includes conveying the carrier 5 through the borehole 2. The conveying at S501 includes arranging the first sensor 102 and the second sensor 103, in the same or in separate housings. The sensors 102, 103 may be arranged such that their directions of sensitivity overlap, partially overlap, or do not overlap. In one embodiment, the first sensor 102 and the second sensor 103 are arranged to have the same direction of sensitivity. At block S502, the process includes performing a first measurement of a first property using the first sensor 102. The first sensor 102 is disposed at the carrier 5 and has a first direction of sensitivity. In alternate embodiments, the first property is measured with the acoustic transducer 112 or the antenna 114. At block S503, the process includes performing a second measurement of a second property using the second sensor 103. The second sensor 103 is disposed at the carrier 5 and the second measurement may be performed at the same time as the first measurement. In an alternate embodiment, the second measurement may be performed before or after the first measurement but within a sufficient time frame such that the conditions in the borehole 2 and properties of the formation 4 are not significantly different during performance of the first and second measurements. At S504, the process includes estimating the first property using a processor that receives the first measurement and the second measurement and corrects the first measurement using the second measurement. The processing of measurements performed by the first sensor 102 and the second sensor 103 may be done by the downhole electronics 9 or by the computer processing system 12 or by a combination of the two. In addition to being stored in memory and, in the case of processing at the downhole electronics 9, being transmitted to the surface, the measurements and processed information may be transmitted to other downhole tools.

While one or more embodiments have been shown and described, modifications and substitutions may be made thereto without departing from the spirit and scope of the invention. Accordingly, it is to be understood that the present invention has been described by way of illustrations and not limitation.

The method flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

In support of the teachings herein, various analysis components may be used, including a digital and/or an analog system. For example, the downhole electronics 9 or the surface computer processing 12 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for estimating a first property in a borehole penetrating the earth, the apparatus comprising:
    a carrier configured to be conveyed through the borehole;
    a first sensor disposed at the carrier, the first sensor having a first direction of sensitivity and configured to perform a first measurement of a first property at a first location;
    a second sensor disposed at the carrier and configured to perform a second measurement of a second property at a second location, the second sensor including a transmitter and a receiver and having a second direction of sensitivity and the first property and the second property being different properties, wherein the first location partially or completely overlaps the second location; and
    a processor configured to receive the first and second measurements and to correct the first measurement using the second measurement in order to estimate the first property, wherein the first sensor is disposed between the transmitter and the receiver of the second sensor.

2. The apparatus according to claim 1, wherein the second direction of sensitivity includes at least a component of the first direction of sensitivity.

3. The apparatus according to claim 1, wherein the first sensor further comprises an antenna configured to transmit and receive an electromagnetic signal in response to an electrical property of an earth formation penetrated by the borehole in order to estimate the electrical property.

4. The apparatus according to claim 1, wherein the first property is resistivity, density, gamma radiation, dielectric permittivity, susceptibility, porosity, or conductivity.

5. The apparatus according to claim 1, wherein the carrier comprises a wireline, a slickline, a drill string, or coiled tubing.

6. A method for estimating a first property in a borehole penetrating the earth, the method comprising:
    conveying a carrier through the borehole;
    performing a first measurement of the first property using a first sensor disposed at the carrier, the first sensor having a first direction of sensitivity;
    performing a second measurement of a second property using a second sensor disposed at the carrier at the same time the first measurement is performed, the second sensor including a transmitter and a receiver and having a second direction of sensitivity, wherein the performing the first measurement is with the first sensor disposed between the transmitter and the receiver of the second sensor; and
    estimating the first property using a processor that receives the first measurement and the second measurement and corrects the first measurement using the second measurement.

7. The method according to claim 6, wherein the performing the second measurement comprises emitting and receiving an acoustic signal in order to measure a distance from the second sensor to a wall of the borehole.

8. The method according to claim 7, wherein the performing the second measurement includes receiving the acoustic signal reflected by a reflector to measure a sound speed of drilling fluid disposed in the borehole based on a known distance between the reflector and the second sensor.

9. The method according to claim 7, wherein the performing the second measurement includes receiving the acoustic signal reflected by the first sensor in order to measure a sound speed of drilling fluid disposed in the borehole based on a known distance between the first sensor and the second sensor.

10. The method according to claim 6, wherein the performing the first measurement further comprises emitting and receiving an electromagnetic signal using an antenna in order to estimate an electrical property of an earth formation penetrated by the borehole.

11. The method according to claim 6, wherein the first property is resistivity conductivity, permittivity, or susceptibility.

12. A non-transitory computer readable medium comprising computer readable instructions for estimating a first property in a borehole penetrating the earth by implementing a method comprising:
    receiving a first measurement of the first property using a processor, the first measurement being performed by a first sensor disposed in the borehole and having a first direction of sensitivity;
    receiving a second measurement of a second property at the same time the first measurement is performed using the processor, the second measurement being performed by a second sensor including a transmitter and a receiver and disposed in the borehole and having a second direction of sensitivity, wherein the receiving the first measurement is with the first sensor disposed between the transmitter and the receiver of the second sensor; and estimating the first property by correcting the first measurement using the second measurement.

\* \* \* \* \*